United States Patent

[11] 3,624,433

| [72] | Inventor | Ralph L. Jaeschke<br>Kenosha, Wis. |
|---|---|---|
| [21] | Appl. No. | 49,261 |
| [22] | Filed | June 24, 1970 |
| [45] | Patented | Nov. 30, 1971 |
| [73] | Assignee | Eaton Yale & Towne Inc.<br>Cleveland, Ohio |

[54] COOLING SYSTEM FOR AN ELECTROMAGNETIC COUPLING APPARATUS
9 Claims, 1 Drawing Fig.

[52] U.S. Cl. .................................................. 310/60,
310/67, 310/112
[51] Int. Cl. .................................................. H02k 9/00
[50] Field of Search .................................................. 310/60, 58,
105, 266, 64, 52, 53, 59, 64, 67, 65, 112, 113, 115, 171

[56] References Cited
UNITED STATES PATENTS

| 3,047,754 | 7/1962 | Jaeschke | 310/105 |
|---|---|---|---|
| 3,389,279 | 6/1968 | Herrick | 310/105 |
| 3,050,647 | 8/1962 | Winther | 310/67 |
| 3,217,197 | 11/1965 | Sturzenberger | 310/105 |
| 2,920,218 | 10/1960 | Beckwith | 310/64 |
| 3,207,934 | 9/1965 | Robinson | 310/64 |

*Primary Examiner*—J. D. Miller
*Assistant Examiner*—R. Skudy
*Attorney*—Teagno & Toddy

ABSTRACT: An electromagnetic coupling apparatus includes input and output members. The input member is drivingly connected with a rotatable annular inductor means and the output member is drivingly connected with rotatable pole means. The rotatable pole means and annular inductor means have a cooperative airgap relation. Field means is associated with the annular inductor means and pole means and is energizable to cause flux to traverse therebetween so that a predetermined amount of torque is transmitted from the input to the output member upon rotation of the input member. Baffle means is provided to improve the cooling efficiency of the electromagnetic coupling apparatus by reducing the amount of air heated by the electromagnetic coupling from recirculating through the electromagnetic coupling.

PATENTED NOV 30 1971
3,624,433
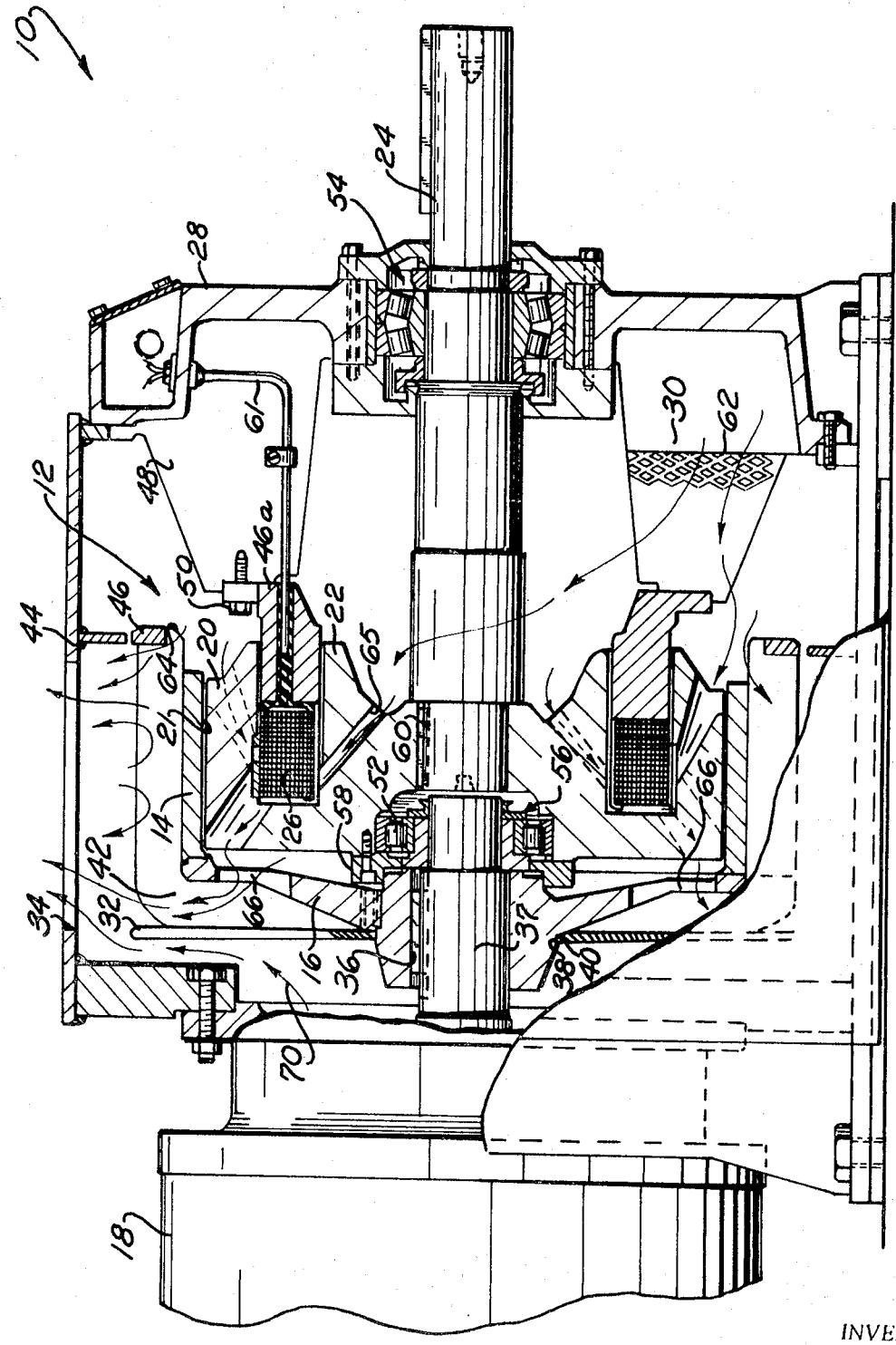
INVENTOR.
RALPH L. JAESCHKE
BY
Leagno & Toddy
ATTORNEYS

COOLING SYSTEM FOR AN ELECTROMAGNETIC COUPLING APPARATUS

The present invention relates to an electromagnetic coupling apparatus, and more particularly an electromagnetic coupling apparatus having an improved cooling system.

A known electromagnetic coupling apparatus includes pole members drivingly connected with an output member and a rotatably annular inductor connected to the input member. The inductor and pole members have an air gap therebetween. A stationary field means is provided to cause magnetic flux to traverse the inductor and pole members. When the input member is driven by an associated motor, the input member cuts lines of magnetic flux which produces eddy currents in the input member which react with the magnetic field established between the input and output member by the field coil. This action generates a driving force or torque causing the output member to rotate with the input member. Heat is created due to the drive between the input and output members. It is important that effective cooling of the coupling occur in order to maximize its effectiveness.

The electromagnetic coupling apparatus of the present invention is effectively cooled by conducting cool air across a portion of the surfaces of its relatively rotatably members to receive heat therefrom. The warm air is blocked from recirculating through the coupling so that a continual supply of cool air flows across the relatively rotatable members.

The relatively rotatable members include pole members and a rotatable annular inductor in a cooperative air gap relationship with the pole members. A field means is provided and may be energized to cause magnetic flux to traverse the inductor and pole members so that torque is transmitted between the inductor and pole members. When torque is transmitted between the inductor and pole members, heat is generated thereby.

A baffle means is associated with the inductor and pole members and operates to block the air, which flows across and is heated by the relatively rotatable members, from recirculating through the electromagnetic coupling. Since the warmed air is blocked from recirculation, it is conducted from the coupling and a continuous supply of cool air flows across the relatively rotatable members. A fan is provided to maintain such air flow so that the coupling is efficiently cooled by constantly drawing cool air into and expelling warmed air from the coupling.

Thus, the baffle plate of the electromagnetic coupling device of the present invention conducts heated or warmed air from the coupling after the air flow across the input and output members and prohibits the warmed air from recirculating in the electromagnetic coupling. By eliminating such recirculation the effectiveness of the cooler air which enters the housing of the electromagnetic coupling through an opening therein is not impaired and efficient cooling is provided. By providing such effective cooling, it is possible for the electromagnetic coupling apparatus of the present invention to transmit a greater amount of horsepower and, in addition, a smaller unit may be used to transmit a predetermined amount of torque.

A further advantage of the present invention is that the warmed air heated by the input and output members of the electromagnetic coupling is blocked from flowing across the portion of the coupling on which the motor which drives the input members is supported. Thus, the motor is not significantly heated by the electromagnetic coupling and the operational efficiency of the cooling system of the present invention is improved thereby.

Accordingly, it is an object of the present invention to provide a new and improved electromagnetic coupling apparatus having an effective cooling system which includes means for conducting a cooling medium therethrough and wherein provision is made for minimizing recirculation of the cooling medium after it is heated in the coupling.

It is yet another object of the present invention to provide an electromagnetic coupling apparatus which includes a rotatable annular inductor means and pole means having a cooperative air gap relation and which further includes a baffle means positioned adjacent to the air gap for blocking the flow of relatively warm air from recirculating through the electromagnetic coupling apparatus.

It is still another object of the present invention to provide a new and improved electromagnetic coupling apparatus which includes a rotatable annular inductor means and rotatable pole means having an air gap relationship and which further includes a baffle plate mounted for rotation with the inductor means for conducting the air warmed by the transmission of torque between the inductor and inductor means and pole means from the coupling so that cool air is constantly supplied to flow across the inductor and pole means.

Further objects, advantages and features of the present invention will be apparent to those skilled in the art to which it relates from the following detailed description made with reference to the accompanying drawing forming a part of this specification and which is a partial sectional view of the electromagnetic coupling apparatus of the immediate invention.

The present invention provides an electromagnetic coupling apparatus having an improved cooling system for increasing the capacity of the electromagnetic coupling apparatus. By effectively cooling the electromagnetic coupling apparatus, it is possible to transmit a greater amount of torque with a smaller electromagnetic coupling since the efficiency of the unit is increased. The present invention may be applied to electromagnetic coupling apparatuses of a wide variety of constructions and designs and for purposes of illustration, is shown in the drawing as applied to an electromagnetic coupling apparatus 10.

The electromagnetic coupling apparatus 10 has a magnetic circuit means, generally indicated at 12. The magnetic circuit means 12 includes a rotatable annular inductor 14 secured to an input member 16. The input member 16 is drivingly connected to a drive means, such as the motor 18, and is rotatably driven thereby. The magnetic circuit means 12 also includes pole means in the form of a group of interdigitated pole members 20 which are connected with and part of the output member 22. The annular inductor 14 is separated from the pole members 20 by a cooperative air gap 21. The specific construction of the inductor 14 and pole means 20 does not form a part of the present invention. The specific construction of these parts may take different forms. Reference is hereby made to U.S. Pat. No. 3,217,197, owned by the assignee of the present application, for a detailed description of one such design of these parts. In the present embodiment, the pole members 20 comprise a series of interdigitated pole members, as described in U.S. Pat. No. 3,217,197.

The output member 22 is drivingly connected to an output shaft 24 and rotates therewith. A stationary field coil 26 is secured to the housing 28 of the electromagnetic coupling apparatus and is energizable to cause flux to traverse the magnetic circuit means 12 so that a predetermined amount of torque is transmitted from the input member 16 to the output member 22 dependent on the magnitude of the flux created by the stationary coil 26. The stationary coil 26 is energized by the provision of power through the wires 61, and the magnitude of the flux generated by the field coil 26 is dependent on the power supplied through the wires 61.

In order to cool the electromagnetic coupling apparatus 10, an opening 30 is provided to allow air to enter the housing 28. The flow of air through the electromagnetic coupling apparatus 10 is generally indicated by the arrows in the drawing. The air is drawn through the opening 30 due to rotation of the coupling apparatus. The air moves generally axially through the interdigitated pole members 20 and the air gap 21. The air also moves generally radially around the annular inductor 14. The air flows from the housing 28 through an opening 34 located adjacent to and radially outwardly of the inductor 14.

As the air flows through the electromagnetic coupling apparatus 10 and across the interdigitated pole members 20 and annular inductor 14 a portion of the heat created by the transmission of torque is received by the air. In order to maintain a constant flow of cool air from outside the housing, a baffle plate 32 is provided to conduct the warm air from the coupling apparatus 10. The baffle plate 32 prohibits the recirculation of the warmed air through the coupling and efficiently removes the heat generated in inductor member 14. Since the warm air is conducted from the coupling apparatus 10 and not allowed to recirculate, the temperature of the air moving through the coupling apparatus 10 is maintained at a lower level and, thus, a greater amount of the heat generated is removed from the coupling apparatus 10.

In addition, the baffle plate 32 blocks the flow of warmed air from contacting the portion of the coupling 10 to which the motor is attached and thereby maintains the electromagnetic coupling 10 at a lower temperature in this area to further increase the efficiency of the coupling of the present invention. The baffle plate 32, as shown in FIGURE 1, is secured to the input member 16 and extends radially of the axis of rotation thereof. The baffle plate 32 is located axially adjacent the air gap 21 and comprises a continuous shield extending circumferentially around the axis of rotation of the input member 16. Any air current which is drawn into the housing 28 is deflected by the baffle plate 32 so that it moves radially outward of the coupling apparatus 10. As a result, the relatively warm air flows from the coupling 10 and does not recirculate and intermingle with the relatively cool air entering the coupling 10. As a result, the relatively warm air flows from the coupling 10 and does not recirculate and intermingle with the relatively cool air entering the coupling 10, and the efficiency of the electromagnetic coupling 10 is improved thereby.

In operation, the motor 18 drives the input member 16 by the motor shaft 37 and key 36. The annular inductor 14 is secured to the input member 16 in any suitable manner and rotates with the input member 16 as it is driven by the motor 18.

The input member 16 has a surface 38 for engaging a central opening 40 in the baffle plate 32. The opening 40 generally conforms to the configuration of the surface 28 so that the input member 16 frictionally engages and drives the baffle plate 32. The input member 16 could be drivingly connected with the baffle plate 32 by other known devices. The baffle plate 32 has a generally circular outer periphery, but it should be understood that the baffle plate may assume other geometric configurations and in some instances, may have deformations in the surface thereof.

The input member 16 also has a number of radially extending fins 42 for directing air and for cooling purposes. The fins 42 act as a fan to draw air into the coupling and along the paths hereabove described so that when the warmed air impinges on the baffle plate 32, is it moved in a radial direction and conducted from the coupling 10. To further control the movement of air, a ring 44 is secured to the housing 28 and a complementary ring 46 is secured to the fins 42 so that the cooling air is forced to move radially through the interdigitated pole members 20 and the air gap 21 and through opening 34.

Since the purpose of the electromagnetic coupling apparatus 10 is to rotate the output shaft 24 at a desired speed, the stationary coil 26 is provided to create a magnetic flux in the pole members 20 and inductor 14. Eddy currents resulting from relative rotation between the inductor 14 and pole members 20 effects a driving connection therebetween, as is known. The field coil 26 for creating the magnetic flux is mounted on a mounting member 46a which in turn is secured to a projection 48 of the housing 28 by a threaded fastener 50 so that the coil 26 is stationarily mounted.

The output member 22 is rotatably mounted by bearings 52 and 54. The bearing 52 is supported by the shaft 37 of the motor 18 and means 56 is provided to prevent axial movement of the bearing 52 with respect to the shaft 37. The outer race of the bearing 52 is engaged by the output member 22 and restrained by a member 58 from longitudinal movement with respect to the output member 22. The output member 22 is drivingly connected to the shaft 24 by any suitable means such as a key 60 so that torque is transmitted from the output member 22 to the shaft 24. The shaft 24 is rotatably supported by the bearing 54, as shown in FIGURE 1, in a manner well known to those skilled in the art.

When in operation, the input member 16 is rotated and the field coil 26 is energized. The difference between the speeds of the input member 16 and the output member 22 produces eddy currents in the annular inductor 14 which react with the magnetic field established by the coil 26. This reaction generates a driving torque causing the output member 22 to rotate, as is known. The difference between the input and output horsepower must be dissipated within the coupling. Therefore, to increase the capacity and for efficiency of the electromagnetic coupling, it is essential to provide effective cooling therefor.

The coupling 10 is effectively cooled by air which enters the housing 28 through the opening 30. The opening 30 is provided with a grill 62 for preventing foreign particles from entering the housing 28. The air then moves across the air gap 21 between the inductor 14 and pole members 20 and through openings 64 provided adjacent the end of the inductor 14 by the fins 42 and ring 46. The air also flows through passages 65 and 66 in the pole members 20.

After the air moves through the air gap 21 and across the output member 22, it continues to move axially along the input and output members 16, 22, respectively, through openings 66 in the input member 16 and subsequently impinges upon the baffle plate 32 which causes the air to flow radially therealong and exit from the housing 28 through the opening 34.

The baffle plate 32 significantly increases the cooling effect of the air flowing across the input and output members 16, 22, respectively, since it prohibits air which has been heated by the coupling from recirculating through the coupling 10 thereby allowing a fresh supply of cool air from outside of the housing to move through the coupling 10. The baffle plate 32 serves to conduct the heated air from the housing 28 through the opening 34. The baffle plate 32 also prohibits this heated air from contacting the surfaces of the coupling 10 to which the motor 18 is mounted so that the motor is not heated thereby. Thus, the baffle plate 32 maintains cooler air flowing across the input and output members 12, 22 and provides for effective cooling to thereby increase the efficiency of the coupling 10 of the present invention.

Having described my invention, I claim:

1. An electromagnetic coupling apparatus comprising input and output members, magnetic circuit means including rotatable pole means and rotatable annular inductor means in a cooperative air gap relation to said pole means, one of said input and output members having said pole means connected therewith and the other member having said inductor means connected therewith, field means energizable to cause flux to traverse said magnetic circuit means so that a predetermined amount of torque is transmitted from the input member to the output member upon rotation of said input member, and baffle means for directing relatively warm air flow from an adjacent mechanism away from the coupling apparatus and blocking the relatively warm air flow from the adjacent mechanism from engagement with the magnetic circuit means thereby increasing the capacity of said electromagnetic coupling apparatus.

2. An electromagnetic coupling apparatus as defined in claim 1 wherein said adjacent mechanism includes a motor associated with said input member and said baffle means includes a baffle plate positioned at one axial end of the coupling apparatus for blocking movement of air heated by the motor associated with said input member from engaging said pole and inductor means.

3. An electromagnetic coupling apparatus as defined in claim 2 further including a housing having an air inlet opening therein for allowing air to flow in for cooling said electromagnetic coupling apparatus, said air inlet being located at the axial end of said coupling opposite said one axial end and said housing having an outlet disposed adjacent to said one axial end for allowing the air to flow therefrom.

4. An apparatus comprising input and output members, magnetic circuit means including rotatable pole means and rotatable annular inductor means in a cooperative air gap relation to said pole means, field means energizable to cause flux to traverse said magnetic circuit means so that a predetermined amount of torque is transmitted from the input member to the output member upon rotation of said input member, motor means disposed axially adjacent said inductor means and drivingly connected to said input member, and baffle means interposed between said inductor means and said means motor means for blocking relatively warm air flow from said input and output members toward said motor and for directing the warm air radially of said input and output members, thereby minimizing recirculation of the warm air and increasing the capacity of said electromagnetic coupling apparatus.

5. An apparatus as defined in claim 4 further including a housing for said input output members and said motor means being located at one end of said housing, said housing having an air inlet opening at the other end thereof, said baffle means being interposed between said inlet opening and said motor.

6. An apparatus as defined in claim 5 wherein said housing has an outlet opening for directing air therefrom, said outlet opening being spaced radially outwardly of said inductor means and said baffle means extending radially adjacent said inductor means and directing said relatively warm air from said motor means toward said outlet opening.

7. An electromagnetic coupling apparatus comprising input and output members, magnetic circuit means including rotatable pole means and rotatable annular inductor means in a cooperative air gap relation to said pole means, one of said input and output members having said pole means connected therewith and the other member having said inductor means connected therewith, field means energizable to cause flux to transverse said magnetic circuit means so that a predetermined amount of torque is transmitted from the input member to the output member upon rotation of said input member, and baffle means for blocking the relatively warm air flow from an adjacent mechanism from engagement with the magnetic circuit means thereby increasing the capacity of said electromagnetic coupling apparatus, said adjacent mechanism including a motor associated with said input member, said baffle means including a baffle plate positioned at one axial end of the coupling apparatus for blocking movement of air heated by the motor associated with the input member from engaging said pole and inductor means and wherein said baffle plate is secured to said input member and rotatable therewith.

8. An apparatus comprising input and output members, magnetic circuit means including rotatable pole means and rotatable annular inductor means in a cooperative air gap relation to said pole means, field means energizable to cause flux to transverse said magnetic circuit means so that a predetermined amount of torque is transmitted from the input member to the output member upon rotation of said input member, motor means disposed axially adjacent said inductor means and drivingly connected to said input member, baffle means interposed between said inductor means and said motor means for blocking relatively warm air flow from said motor means from engagement with the magnetic circuit means thereby increasing the capacity of said electromagnetic coupling apparatus, and a housing for said input and output members, said motor means being located at one end of said housing, said housing having an air inlet opening at the other end thereof, said baffle means being interposed between said inlet opening and said motor, said housing having an outlet opening for directing air therefrom, said outlet opening being spaced radially outwardly of said inductor means and said baffle means extending radially adjacent said inductor means and wherein said baffle means comprises a radially extending plate secured to said input member and rotatable therewith.

9. An electromagnetic coupling apparatus comprising a housing, input and output members, magnetic circuit means including rotatable pole means and rotatable inductor means in a cooperative air gap relation to said pole means, one of said input and output members having said pole means connected therewith and the other member having said inductor means connected therewith, motor means connected to said input member for effecting rotation thereof, field means energizable to cause flux to transverse said magnetic circuit means so that a predetermined amount of torque is transmitted from said input member to said output member upon rotation of said input member by said motor means, said housing including an air inlet providing for the flow of air for cooling said magnetic circuit means and an air outlet spaced from said air inlet for directing air heated by said magnetic circuit means from said housing and baffle means disposed in said housing adjacent to said outlet for directing relatively warm air flow from said motor means toward said outlet and blocking the relatively warm air flow from the motor means from engagement with said magnetic circuit means thereby increasing the capacity of said electromagnetic coupling apparatus.

* * * * *